United States Patent

[11] 3,601,558

[72] Inventors Hiroshi Sugaya
Suita-shi;
Fukashi Kobayashi, Hirakata-shi; Mitsuaki Ono, Osaka, all of, Japan
[21] Appl. No. 775,348
[22] Filed Nov. 13, 1968
[45] Patented Aug. 24, 1971
[73] Assignee Matsushita Electric Industrial Co., Ltd. Osaka, Japan
[32] Priority Nov. 20, 1967, Oct. 4, 1968, Oct. 4, 1968, Oct. 4, 1968, Oct. 11, 1968
[33] Japan
[31] 42-75019, 43-72655, 43-87071, 43-87072 and 43-88970

[54] CARTRIDGE-TYPE MAGNETIC TAPE RECORDING AND REPRODUCING APPARATUS WITH MEANS TO INDICATE THE COERCIVITY OF THE TAPE

6 Claims, 12 Drawing Figs.

[52] U.S. Cl. 179/100.2 Z, 179/100.2 A, 179/100.2 K
[51] Int. Cl. G11b 5/44, G11b 15/12, G11b 23/08
[50] Field of Search 179/100.2 A, 100.2 B, 100.2 K, 100.2 Z, 100.2 D; 352/72, 78

[56] References Cited

UNITED STATES PATENTS 3,037,093 5/1962 Nowlan 177/100.2
3,247,328 4/1966 Mitchell 179/100.2

*Primary Examiner*—Bernard Konick
*Assistant Examiner*—J. Russell Goudeau
*Attorney*—Stevens, Davis, Miller & Mosher

ABSTRACT: A cartridge-type magnetic tape recording and reproducing apparatus which is so designed that the recording or reproducing conditions are automatically adjusted in accordance with the physical characteristics of a magnetic tape accommodated in a tape cartridge or with the reproducing conditions of a recorded tape accommodated in said tape cartridge.

INVENTORS
HIROSHI SUGAYA,
FUKASHI KOBAYASHI,
MITSUAKI ONO

BY Stevens, Davis, Miller & Mosher
ATTORNEYS

INVENTORS
HIROSHI SUGAYA,
FUKASHI KOBAYASHI,
MITSUAKI ONO

BY Stevens, Davis, Miller & Mosher
ATTORNEYS

INVENTORS
HIROSHI SUGAYA,
FUKASHI KOBAYASHI
MITSUAKI ONO
BY Stevens, Davis, Miller & Mosher
ATTORNEYS

CARTRIDGE-TYPE MAGNETIC TAPE RECORDING AND REPRODUCING APPARATUS WITH MEANS TO INDICATE THE COERCIVITY OF THE TAPE

This invention relates to a cartridge-type magnetic tape recording and reproducing apparatus.

Recording media presently used in magnetic tape recording and reproducing apparatus mostly consist of iron oxide magnetic material represented by the formula $\gamma$-$Fe_2O_3$ and it has been believed that the magnetic material of $\gamma$-$Fe_2O_3$ is best of all for use in the production of magnetic tapes because of its excellent physical characteristics and high stability. However, the coercive force of the iron oxide magnetic material can be increased only up to about 320 Oe and the coercive forces of the presently used iron oxide magnetic materials are uniformalized at a value of 270 to 290 Oe in consideration of interchangeability of the tapes using said magnetic tape recording and reproducing apparatus.

On the other hand, with the rapid progress of the recording technique and the increasing amount of information to be recorded in recent days, there has been an increasing requirement for recording of information at high packing density and the wavelength recorded on a tape is becoming shorter and shorter. Thus, recording wavelength of 1 micron or even shorter has become necessary. In general, shortening of a recording wavelength results in increasing difficulty of recording and lowering of reproducing output. In order to avoid such disadvantages, the coercive force and the remanent of a magnetic tape must be made large. The coercive force of recording medium and the thickness of the coating thereof are particularly important for the shortening of recording wavelength, and there is a tendency that lowering of the reproducing output decreases as the coercive force becomes greater. Under the circumstances, many researches and developments have been made heretofore with a view to finding a magnetic material of high coercive force which can be used in place of $\gamma$-$Fe_2O_3$ but none of them has ever been materialized for practical application. This is because of the fact that a magnetic material which is large in coercive force and remanent only is not entirely satisfactory for use as a material for magnetic tapes, and a magnetic material to be used for magnetic tape must be satisfactory in many other aspects, such as productivity and stability of its physical characteristics. Recently, some materials, e.g. chromium dioxide, cobalt ferrite and various alloy powders, have been found to have a good prospect of use for practical application, but there still remains a problem which must be overcome before said materials are made available for practical use, that is, the problem of noninterchangeability of the product tapes due to difference in coercive force. In general, the optimum values of bias current, signal current, erasing current, etc. in a recording apparatus vary with coercive force, and therefore, with the presently used apparatus which are designed solely for $\gamma$-$Fe_2O_3$, recording of tapes having high coercive force is impossible and thus the interchangeability of the tapes is lost. It is for this reason that the tapes of high coercive force and excellent short-wavelength characteristic, which have been developed after strenuous efforts, have not yet been put into practical use. However, under the circumstances wherein the demand for a tape of high coercive force capable of recording at high packing density is inevitable, the problem of tape interchangeability must be solved anyway, thereby to provide for free selection of a desired tape from those of varying coercive force.

With reference next to a recorded tape, reproduction of the recorded tape generally necessitates adjustment of tape speed and adjustment of emphasis incident thereto. Such adjustments will have to be made by the operator in accordance with the specifications of individual tapes in the future when use of recorded tapes becomes popular, and in addition, will diminish the meritorious feature of cartridge tapes, i.e. easiness in handling of the tape, from the standpoint of overall operation.

In order for cartridge tapes to be used more popularly, it is essential that the tape speed is selected for any one of cartridge tapes of varying speed and further a device must be made so as not to diminish the easiness of handling of the cartridge tape. The present invention has been achieved to meet such requirements by enabling all of the adjustments required for recording or reproducing to be made automatically, and is of great value.

Namely, according to the present invention, a magnetic tape recording and reproducing apparatus can be adjusted to the optimum recording or reproducing conditions automatically, only by mounting a cartridge tape of any physical characteristics in said apparatus. By employing the present invention, the following advantages are brought about:

i. A tape of the type most adapted for the purpose of recording can be used optionally without requiring any adjustment of a magnetic tape recording and reproducing apparatus used.

ii. In reproducing a recorded tape, the tape speed, emphasis and reproducing level, etc. can be adjusted automatically in accordance with the conditions under which said tape was recorded.

iii. Therefore, a complete interchangeability of tapes can be obtained.

According to the present invention, adjustments of the recording level, bias current and erasing current, etc. of a magnetic tape recording and reproducing apparatus as necessitated by differences in physical characteristics, e.g. coercive force, of a magnetic tape accommodated in a tape cartridge of the type having either one or both of a tape supply reel and a tape-winding reel, in the recording of said magnetic tape, can be adjusted automatically, by only mounting said tape cartridge in said magnetic tape recording and reproducing apparatus.

Other objects, features and advantages of the invention will be better understood from the following detailed description taken in conjunction with the accompanying drawings in which.

Figure 5B:
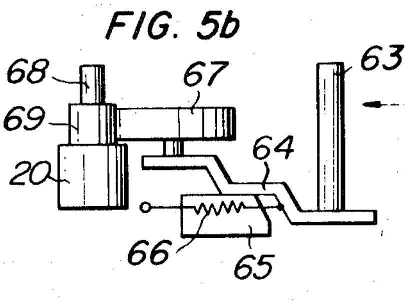
Figure 5A:
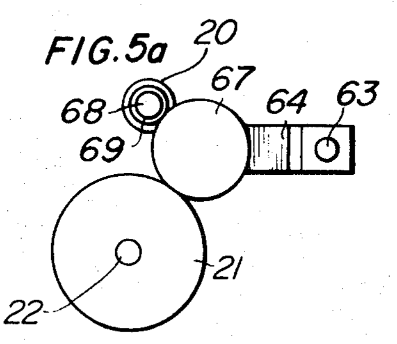
Figure 6:
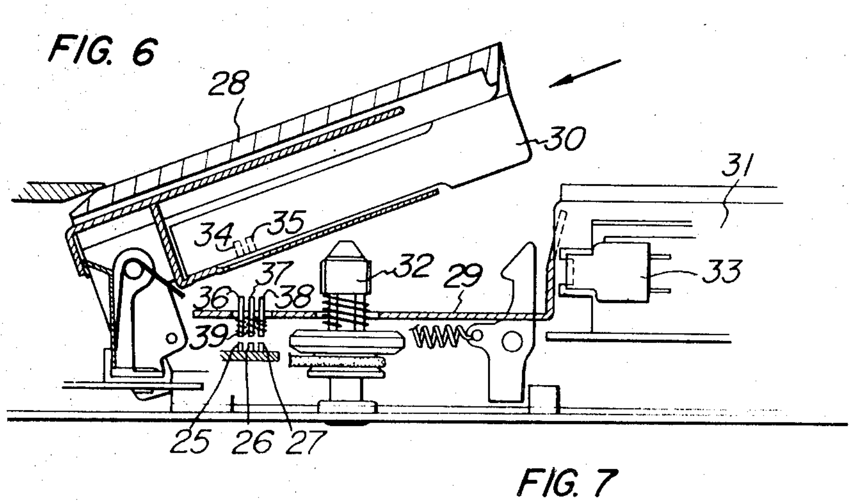
Figure 7:
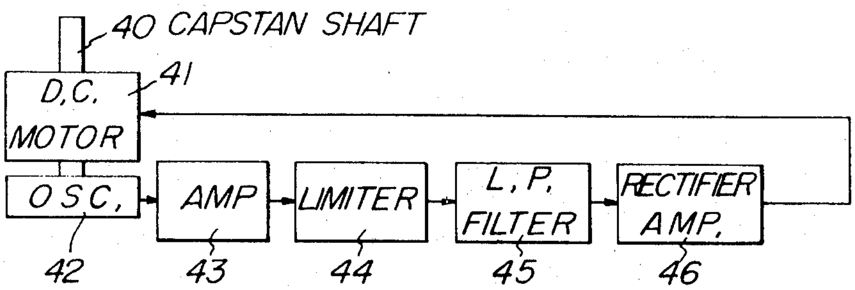
Figure 8:
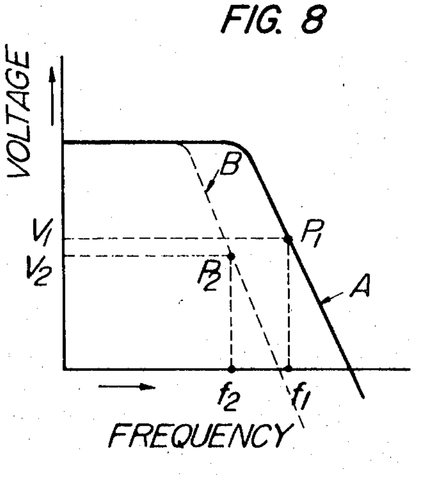
Figures 9, 10A, 10B:
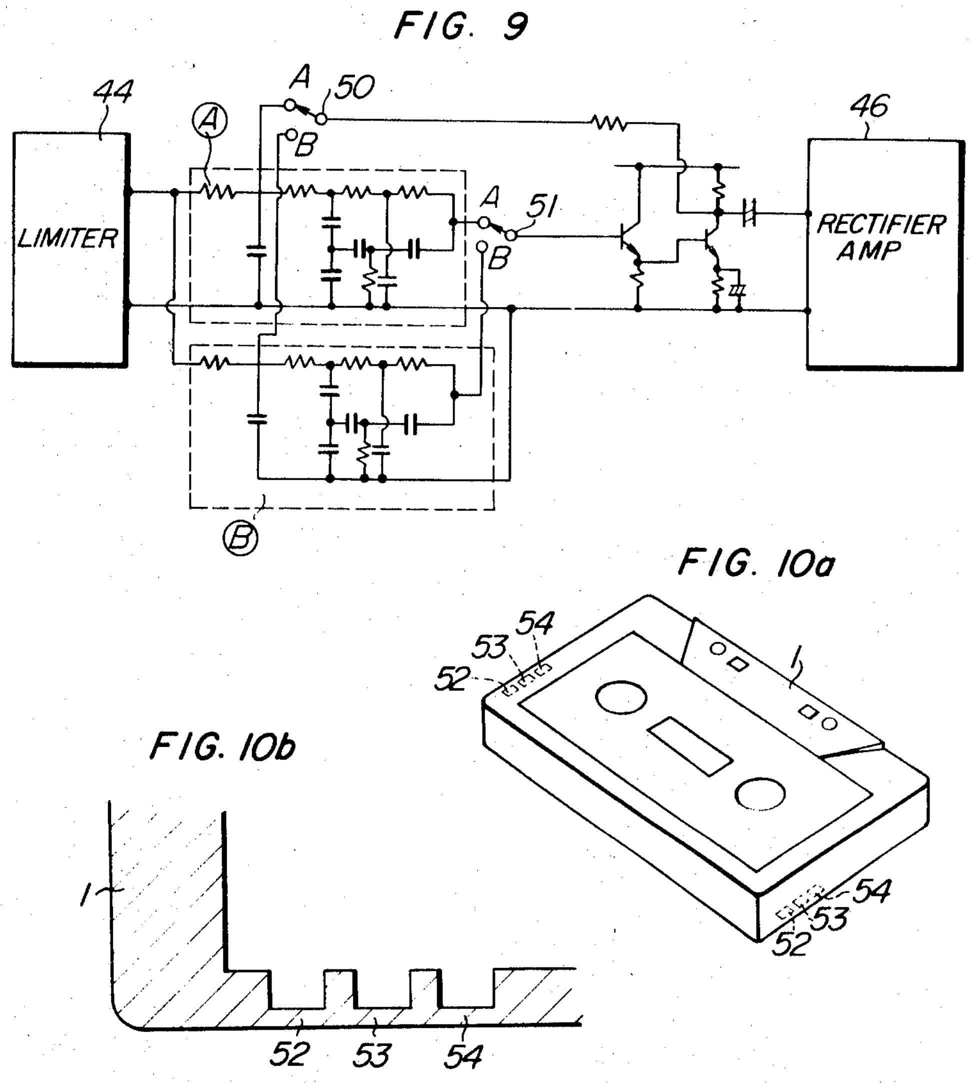

FIGS. 5*a* and 5*b* are a top plan view and a side view respectively of a mechanism for automatically adjusting the tape recording or reproducing conditions in one embodiment of the invention;

FIG. 6 is a sectional view showing the correlation between the tape cartridge and the magnetic tape recording and reproducing apparatus according to another embodiment of the invention;

FIG. 7 is a block diagram showing means for controlling a tape-driving capstan motor;

FIG. 8 is a diagram graphically showing the characteristics of a low-pass filter;

FIG. 9 is a wiring diagram of an active filter which constitutes one block in FIG. 7; and FIGS. 10*a* and 10*b* are a perspective view and a fragmentary sectional view of a principal portion of another form of the cartridge in the present invention respectively.

Figure 1:
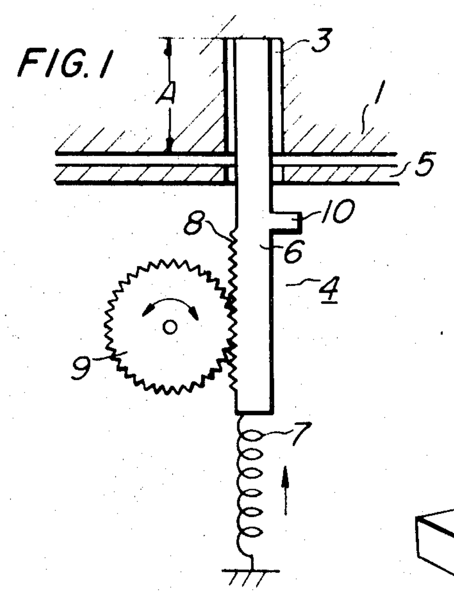
FIG. 1 is a fragmentary sectional view showing a principal portion in an embodiment of the magnetic tape recording and reproducing apparatus according to the present invention.

In describing an embodiment of the present invention with reference to FIG. 1 at first, reference numeral 1 designates a cartridge with a tape supply reel and a winding reel accommodated therein, and the coercive force of the tape 2 is clearly indicated on the surface of said cartridge. Reference numeral 3 designates a hole formed at right angles to the horizontal plane of the cartridge 1, whose depth A is determined in accordance with the coercive force of the tape 2. For instance, the depth of the hole A is greater when the coercive force of the tape is from 250 to 350 Oe, is smaller when the coercive force is from 350 to 500 Oe and is even smaller when the coercive force is from 500 to 700 Oe.

A magnetic tape recording and reproducing apparatus 4 is provided with a vertically movable lever 6 which is adapted to be received in the aforesaid hole 3 in the cartridge from the underside through a panel 5 when said cartridge is mounted on said magnetic tape recording and reproducing apparatus. The lever 6 is biased upwardly under the biasing force of a spring 7 and provided with a rack 8 at a portion of one sidewall thereof which is in engagement with a gear 9 by which a variable resistor or the like for altering the recording level, bias current or erasing current is controlled. The lever 6 is also provided with a projection 10 for contact with the underside of the panel 5 when a recording medium consists, for example, of $\gamma\text{-}Fe_2O_3$.

With the arrangement described above, when a cartridge containing a tape of small coercive force is used, the lever 6 is only shallowly received in the hole 3 because the depth of the hole is small and accordingly the gear 9 is rotated through a relatively small angle. On the other hand, when a cartridge containing a tape of large coercive force is used, the lever 6 is received in the hole 3 deeper than in the preceding case, with the result that the gear 9 is rotated through a larger angle accordingly. Further, when a cartridge containing a tape of larger coercive force than in the immediately preceding case is employed, the lever 6 is received even deeper in the hole 3 and the gear 9 is rotated through an even larger angle accordingly.

The gear 9 is operatively associated with a recording level-, bias current- and erasing current-adjusting variable resistor to control the variable resistor as described above, so that a recording level, a bias current and an erasing current in accordance with the depth of the hole 3 or the coercive force of the tape used can be obtained automatically.

Figure 3:
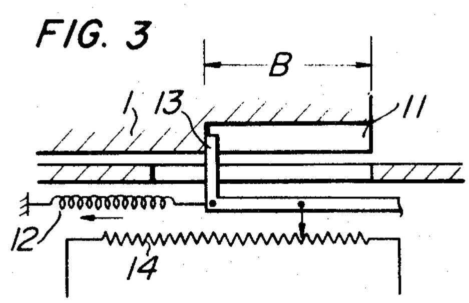
FIG. 3 is a fragmentary sectional view showing a principal portion of another embodiment of the apparatus of this invention.

Alternatively, the recording level and the bias current, etc. may be varied in accordance with the coercive force of the tape used, by employing the arrangement shown in FIG. 3, wherein a groove 11 is formed in the rear portion of the cartridge 1 and the resistance value of a slide rheostat 14 is varied by the position of a lever 13 which is slidably received in said groove 11 at its top end and biased by a spring 12 for engagement with the end wall of said groove, the position of said lever 13 being determined by the length B of said groove 11.

Figure 4:
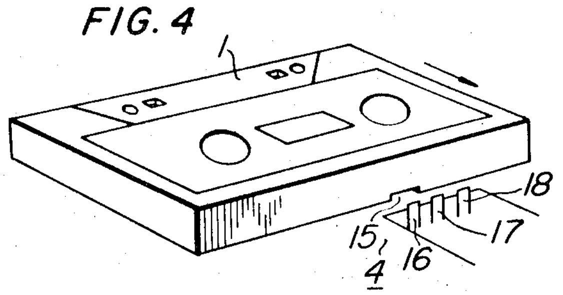
FIG. 4 is a perspective view of a principal portion of still another embodiment of the apparatus of this invention.
Figure 2:
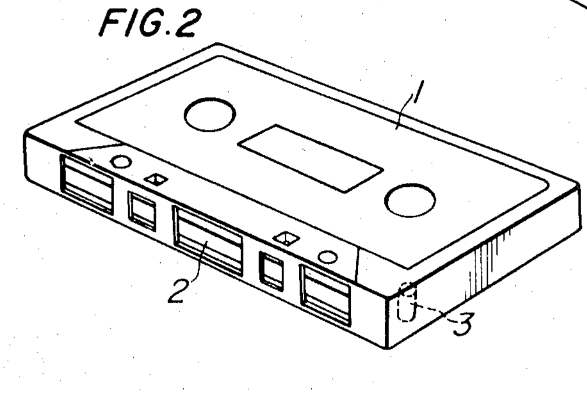
FIG. 2 is a perspective view of a tape cartridge used in the apparatus.

Still alternatively, the recording level and the bias current, etc. may be adjusted by employing the arrangement shown in FIG. 4. Namely, according to this arrangement, a groove 15 is formed in the rear portion of the cartridge 1 at a location corresponding to the coercive force of the particular tape accommodated in said cartridge, while switch-operating strips 16, 17 and 18 are provided on the magnetic tape recording and reproducing apparatus 4 at locations each corresponding to the groove 15 of a specific cartridge. Suppose that when a cartridge containing a tape of small coercive force is mounted on the magnetic tape recording and reproducing apparatus 4 by pushing the former rearwardly of the apparatus, the groove 15 of said cartridge is located opposite, for example, the switch-operating strip 16, the switch-operating strip 16 is received in said groove 15 and remains in its position, while the other switch-operating strips 17, 18 are pushed by the rear end of the cartridge and thus their positions are shifted, whereby switches associated with said respective switch-operating strips 17, 18 are actuated and resistors to be controlled by said respective switches are inserted in or released from a circuit.

The same purpose may be attained by forming recessed portions 52, 53, or 54 in the wall surface of the cartridge 1, instead of the aforesaid groove 15, at a location corresponding to the magnetic characteristic of the particular tape to be accommodated in said cartridge as shown in FIG. 10. The recessed portion may be provided by means of mechanical force, heat, light or a chemical either before or after the tape is mounted in the cartridge. For instance, the recessed portion may be formed during the fabrication process of the cartridge.

As described above, according to the present invention the recording level, biasing level or erasing current can be automatically adjusted so as to be adapted for the physical properties, e.g. the coercive force, of the said tape-accommodating cartridge and selecting the depth of a hole, the length of a groove or the position of a groove formed in said cartridge, in accordance therewith.

To this point, a description has been made as to the setting of recording conditions under which recording of a magnetic tape is effected. A manner in which conditions for reproducing a recorded tape are set, according to the invention, will be described hereunder.

Problems encountered in the reproduction of a recorded tape are the tape speed and the emphasis associated therewith. While the cartridge tapes presently in use are all operable at a single speed, it will become necessary to record tapes at various speeds depending upon differences in the physical characteristics of the magnetic tapes accommodated in various cartridges and the content to be recorded on said tapes.

In this case, various cartridge tapes may be used at the optimum speeds thereto by shifting the tape-running speed of the reproducing apparatus, if the optimum speed of the particular tape is only indicated on the surface of the cartridge casing, but this is not entirely satisfactory in the light of the primary advantage of cartridge tape, that is, the simplicity in operation of the cartridge tape. Further, according to the method described, the emphasis of a reproducing circuit must be shifted incident to a change in the tape-running speed, rendering the operation extremely cumbersome in the practical use of a cartridge tape. According to the present invention, however, the tape speed, emphasis, reproducing level, etc. can be adjusted automatically by means of a groove or a hole formed at a portion of the cartridge casing, as in the aforesaid case of changing the recording conditions. The mechanism for this is exemplified in FIGS. *5a* and *5b*.

Referring to FIGS. *5a* and *5b*, reference numeral 63 designates a movable rod the position of which is determined by the length of a slot formed in a cartridge casing, such as that shown in FIG. 1. Upon displacement of the movable rod 63, the position of an idler 67 is changed by a bar 64, connected to a slide base 65 and the movable rod 63, and thus said idler 67 is brought into pressure contact with one of different diameter portions 68, 69 and 20 of the driving shaft of a motor which drives a flywheel 21 of a capstan 22 through said idler 67. Thus, it will be understood that the capstan 22 is driven at different rates as determined by the position of the idler 67 in engagement with the motor shaft. In the manner described, the tape speed is automatically shifted in accordance with the depth of the slot formed in the cartridge casing.

The embodiment described above is merely illustrative of the present invention and besides, the tape speed may also be shifted by selectively actuating switches by means of a slit as shown in FIG. 4 and thereby operating a solenoid plunger. Similarly, the emphasis can be shifted simultaneously in accordance with the particular speed of the tape.

FIGS. 6 to 9 inclusive show still another embodiment of the invention, which is so designed that in the reproduction of a recorded cartridge tape, the tape-running speed of a reproducing apparatus is automatically adjusted in accordance with the speed at which said tape was recorded. In FIG. 6, reference numeral 31 designates a portion where a cartridge tape is mounted on a cartridge-type magnetic tape recording and reproducing apparatus and 30 designates a magnetic tape cartridge mounted in the recording and reproducing apparatus in the direction of the arrow. This figure shows a position immediately after the cartridge tape is mounted in the reproducing apparatus 31 and in the actual reproduction of the tape, a cartridge-holder 28 is further tilted to a horizontal position, with the cartridge tape 30 therein.

Reference numerals 34, 35 designate holes formed in the cartridge casing to select the tape speed. When the cartridge-holder 28 is laid horizontally, two of switching pins 36, 37 and 38, projecting outwardly through the chassis 29 of the reproducing apparatus, that is, the switching pins 37 and 38 in the case shown, are received in the holes 34 and 35, and therefore microswitches 26 and 27 provided beneath said respective switching pins are not actuated. However, the switching pin 36 is depressed by the bottom plate of the cartridge casing when the cartridge-holder 28 is laid down in a horizontal position, because no hole is present in said bottom plate of the cartridge casing opposite thereto, and thus a microswitch 25 is actuated. In the Figure, reference numeral 32 designates a driving shaft for a tape-winding reel contained in the cartridge 30 and 33 designate a magnetic head for recording and reproducing.

FIG. 7 is a basic block diagram of a system for controlling the tape-driving capstan motor by the function of the aforesaid microswitches 25, 26 and 27. In FIG. 7, reference numeral 40 designates a shaft of the tape-driving capstan, 41 a DC motor connected directly with the shaft 40 and 42 a speed oscillator connected directly with the motor 41 and adapted to generate a signal of a frequency in proportion to the rate of rotation of the motor 41. The signal generated by the tacho generator 42 is amplified by an AC amplifier 43 and an output of said amplifier 43 is led to a limiter 44, whereby a fluctuation of the output is removed and a signal of uniform amplitude is produced. The signal leaving the limiter 44 passes through an active filter 45, consisting of a combination of a low-pass filter and a twin T circuit, whereby the signal is converted into a output of an amplitude in proportion to the frequency of the signal. This signal is further led into 46 to be rectified and amplified thereby and used as a power source for driving the capstan motor 41. With the system described above, when, for instance, the rate of rotation of the capstan motor 41 becomes higher than a level at which it should be regulated, the frequency generated by the tach-generator becomes greater and accordingly the amplitude of the output of the low-pass filter 45 becomes smaller. As a result, the output voltage of the rectifier-amplifier 46 is reduced and the number of revolution of the capstan motor 41 is restricted. Thus, the number of revolutions of the capstan motor 41 is maintained constant. If the number of revolutions of the capstan motor 41 is desired to be shifted, e.g. from a tape speed of 4.75 cm./sec. to 9.5 cm./sec., this can be achieved by shifting the positions of switches 50, 51 from A to B in FIG 9. By this operation, a circuit encircled by the dotted line is shifted from A to B and the constants of the low-pass filter and the twin T circuit, included in said circuit, are changed. The filter characteristic in this case is shown in FIG. 8, wherein a curve A represents the filter characteristic when the switches 50, 51 are in the position A and a curve B represents the filter characteristic when said switches are in the position B. Therefore, assuming that the tape speed of 9.5 cm./sec. corresponds to the curve A, the operating point in this case is located at $P_1$ and the output of the filter 45 is $V_1$ which is the voltage at which the D.C. motor is rotated at such a rate that the frequency generated by the speed oscillator 42, connected directly with the D.C. motor, becomes $f_1$. Then, the positions of the microswitches 50, 51 are shifted to the position B respectively to shift the tape speed to 4.75 cm./sec. The characteristic of the filter 45 in this case takes the form of the alternate long and short curved line B in FIG. 8 and the operating point moves to $P_2$. Namely, the frequency generated by the speed oscillator 42 is attenuated from $f_1$ to $f_2$ and the number of revolutions of the motor 41 is reduced to a tape speed of 4.75 cm./sec. In this case, the output voltage $V_2$ of the filter 45 varies somewhat from the previous value of $V_1$, since the rate of rotation of the motor 41 is varied.

In the manner described, the tape speed can be shifted circuitwise simply, only by switching of the microswitches 50, 51. Therefore, by associating the microswitches 25, 26 and 27, shown in FIG. 6, with the microswitches 50, 51, a desired tape speed can be obtained automatically only by mounting the tape cartridge 30 in the reproducing apparatus 31.

As will be understood from the foregoing description, the primary object of the present invention is to enable the recording conditions or reproducing conditions to be adjusted automatically upon mounting of a cartridge tape on a magnetic tape recording and reproducing apparatus, by programming the desired recording or reproducing conditions, in accordance with the type of the tape contained in said cartridge or the recording conditions under which said tape was recorded, at a portion of the cartridge casing by mechanical means, regardless of the structure of the cartridge casing. Therefore, the present invention is applicable, not only to an audio-recording apparatus but also to any magnetic tape recording and reproducing apparatus, including those for video-recording and instrumentation recording, which are operative with cartridge tapes.

What is claimed is:

1. In a tape recording and reproducing apparatus including a tape cartridge having a casing, supply and takeup reels accommodated in said casing, magnetic tape of a predetermined coercivity disposed on said reels, and magnetic head means for applying a signal to said magnetic tape, the improvement comprising: at least one deformation formed in said casing representing said predetermined coercivity; means detecting said at least one deformation including means disposed on said recording and reproducing apparatus and cooperating with said deformation; and transducing means, including said magnetic head means and means operatively associated with said detecting means for adjusting the amplitude of said signals applied to said tape.

2. The apparatus according to claim 1 wherein said at least one deformation further comprises at least one hole defined by said cartridge casing, the depth of said hole within said casing being proportional to the coercive force of the magnetic tape contained within said cartridge.

3. The tape recording and reproducing apparatus of claim 1, further comprising means operatively associated with said detecting means and varying the rate at which said magnetic tape is driven past said head means.

4. The tape recording and reproducing apparatus of claim 3, wherein said driving means comprises: a driving shaft of a motor having a plurality of diameter portions; a flywheel; means operatively connecting said flywheel with said tape; and means driving said fly wheel through said driving shaft, said flywheel-driving means being operatively connected to said detecting means; and wherein said flywheel-driving means is operatively associated with a given diameter portion of said shaft to vary the speed at which said tape is driven.

5. The recording and reproducing apparatus of claim 3, wherein said driving means comprises a motor; means operatively connecting said motor to said tape; means generating a signal having a frequency proportional to the rate of rotation of said motor; and means converting said generated signal into an output having an amplitude proportional to the frequency of said generated signal; wherein said detecting means includes means switching from a first of said converting means to a second of said converting means to vary the speed at which said tape is driven.

6. The recording and reproducing apparatus of claim 5, wherein said first and second converting means each comprises a filter circuit.